(12) United States Patent
Berkemeier et al.

(10) Patent No.: US 11,603,100 B2
(45) Date of Patent: Mar. 14, 2023

(54) AUTOMATED REVERSING BY FOLLOWING USER-SELECTED TRAJECTORIES AND ESTIMATING VEHICLE MOTION

(71) Applicant: Continental Automotive Systems, Inc., Auburn Hills, MI (US)

(72) Inventors: Matthew Donald Berkemeier, Beverly Hills, MI (US); Xin Yu, Jiujiang (CN); Danny Bynum, Lake Orion, MI (US); Julien Ip, Madison Heights, MI (US); Kyle P Carpenter, Rochester, MI (US); Eduardo Llanos, Auburn Hills, MI (US); Dhiren Verma, Farmington Hills, MI (US)

(73) Assignee: Continental Autonomous Mobility US, LLC, Auburn Hills, MI (US)

( * ) Notice: Subject to any disclaimer, the term of this patent is extended or adjusted under 35 U.S.C. 154(b) by 9 days.

(21) Appl. No.: 16/530,931

(22) Filed: Aug. 2, 2019

(65) Prior Publication Data

US 2020/0062257 A1 Feb. 27, 2020

Related U.S. Application Data

(60) Provisional application No. 62/714,385, filed on Aug. 3, 2018.

(51) Int. Cl.
*B60W 30/18* (2012.01)
*G05D 1/00* (2006.01)
*G05D 1/02* (2020.01)

(52) U.S. Cl.
CPC ..... *B60W 30/18036* (2013.01); *G05D 1/0088* (2013.01); *G05D 1/0246* (2013.01);
(Continued)

(58) Field of Classification Search
CPC ....... B60W 30/18036; B60W 2520/06; B60W 2540/18; G05D 1/0088; G05D 1/0246; G05D 2201/0213; G05D 1/0212
See application file for complete search history.

(56) References Cited

U.S. PATENT DOCUMENTS 8,560,234 B2 * 10/2013 Kahn ...................... G01S 19/49
701/470
9,290,202 B2 3/2016 Lavoie
(Continued)

FOREIGN PATENT DOCUMENTS

CN 1577199 A 2/2005
CN 101270983 A 9/2008
(Continued)

OTHER PUBLICATIONS

The International Search Report and Written Opinion of the International Searching Authority dated Nov. 8, 2019 for corresponding PCT application No. PCT/US2019/045075.
(Continued)

*Primary Examiner* — Peter D Nolan
*Assistant Examiner* — Kenneth M Dunne

(57) ABSTRACT

A method includes receiving one or more images from a camera positioned on a back portion of the vehicle and receiving a driver planned path from a user interface. The driver planned path includes a plurality of waypoints. The method also includes transmitting one or more commands to a drive system causing the vehicle to autonomously maneuver along the driver planned path. The method also includes determining a current vehicle position and an estimated subsequent vehicle position. The method also includes determining a path adjustment from the current vehicle position to the estimated subsequent vehicle position. The method also includes transmitting instructions to the drive system
(Continued)

causing the vehicle to autonomously maneuver towards the estimated subsequent vehicle position based on the path adjustment.

21 Claims, 12 Drawing Sheets

(52) U.S. Cl.
CPC ..... *B60W 2520/06* (2013.01); *B60W 2540/18* (2013.01); *G05D 2201/0213* (2013.01)

(56) References Cited

U.S. PATENT DOCUMENTS

| | | | |
|---|---|---|---|
| 9,500,497 B2* | 11/2016 | Lavoie | B60W 30/00 |
| 9,533,683 B2* | 1/2017 | Lavoie | B62D 13/06 |
| 9,969,386 B1* | 5/2018 | Wang | B60W 30/06 |
| 10,829,045 B2 | 11/2020 | Berkemeier et al. | |
| 2004/0254720 A1 | 12/2004 | Tanaka et al. | |
| 2005/0021203 A1* | 1/2005 | Iwazaki | B62D 15/0285 |
| | | | 701/36 |
| 2005/0264432 A1 | 1/2005 | Tanaka et al. | |
| 2005/0074143 A1 | 4/2005 | Kawai | |
| 2008/0231701 A1 | 9/2008 | Greenwood et al. | |
| 2010/0096203 A1 | 4/2010 | Freese V et al. | |
| 2012/0271515 A1 | 10/2012 | Rhode et al. | |
| 2013/0006472 A1 | 1/2013 | McClain et al. | |
| 2013/0024064 A1* | 1/2013 | Shepard | B62D 15/028 |
| | | | 701/1 |
| 2014/0052337 A1 | 2/2014 | Lavoie et al. | |
| 2014/0058614 A1 | 2/2014 | Trombley et al. | |
| 2014/0218522 A1 | 8/2014 | Lavoie et al. | |
| 2014/0267688 A1 | 9/2014 | Aich et al. | |
| 2014/0358429 A1 | 12/2014 | Shutko et al. | |
| 2015/0094945 A1* | 4/2015 | Cheng | G01C 21/3461 |
| | | | 701/408 |
| 2015/0217693 A1 | 8/2015 | Pliefke et al. | |
| 2016/0023601 A1 | 1/2016 | Windeler | |
| 2016/0052548 A1 | 2/2016 | Singh | |
| 2016/0129939 A1 | 5/2016 | Singh et al. | |
| 2016/0146618 A1 | 5/2016 | Caveney | |
| 2016/0304122 A1 | 10/2016 | Herzog et al. | |
| 2016/0362135 A1* | 12/2016 | Xu | B62D 13/06 |
| 2016/0378118 A1 | 12/2016 | Zeng et al. | |
| 2017/0050672 A1 | 2/2017 | Gieseke et al. | |
| 2017/0140228 A1 | 5/2017 | Fellner | |
| 2017/0151846 A1 | 6/2017 | Wuergler et al. | |
| 2018/0079395 A1 | 3/2018 | Cekola et al. | |
| 2018/0088590 A1 | 3/2018 | Zhu et al. | |
| 2018/0181142 A1 | 6/2018 | Baran | |
| 2018/0188734 A1 | 7/2018 | Zhu | |
| 2018/0194344 A1 | 7/2018 | Wang | |
| 2018/0215382 A1* | 8/2018 | Gupta | B60W 30/18036 |
| 2018/0251153 A1 | 9/2018 | Li et al. | |
| 2018/0312022 A1 | 11/2018 | Mattern et al. | |
| 2018/0350108 A1 | 12/2018 | Wang | |
| 2019/0029109 A1 | 1/2019 | Uejima | |
| 2019/0346858 A1 | 11/2019 | Berkemeier et al. | |
| 2019/0383945 A1* | 12/2019 | Wang | G01S 17/42 |
| 2020/0001790 A1* | 1/2020 | Ling | B62D 15/0285 |
| 2020/0019182 A1* | 1/2020 | Ling | B60R 1/00 |
| 2020/0097021 A1* | 3/2020 | Carpenter | G05D 1/0225 |
| 2021/0163068 A1* | 6/2021 | Zhu | B62D 15/0285 |
| 2021/0197798 A1* | 7/2021 | Funke | G05D 1/0212 |

FOREIGN PATENT DOCUMENTS

| | | |
|---|---|---|
| CN | 102745193 A | 10/2012 |
| CN | 103998325 A | 8/2014 |
| CN | 104590116 A | 5/2015 |
| CN | 106043281 A | 10/2016 |
| CN | 106697050 A | 5/2017 |
| CN | 107567412 A | 1/2018 |
| CN | 108136867 A | 6/2018 |
| CN | 108255171 A | 7/2018 |
| CN | 112805207 A | 5/2021 |
| DE | 102012001380 A1 | 8/2012 |
| DE | 102012005707 A1 | 10/2012 |
| EP | 2682329 A1 | 1/2014 |
| EP | 3081405 A2 | 10/2016 |
| JP | 2004291866 A | 10/2004 |
| JP | 2005014775 A | 1/2005 |
| JP | 2005313710 A | 11/2005 |
| JP | 2016203972 A | 12/2016 |
| JP | 2017105439 A | 6/2017 |
| WO | 2016164118 A2 | 10/2016 |
| WO | 2018160960 A1 | 9/2018 |

OTHER PUBLICATIONS

File history for U.S. Appl. No. 16/407,081, including non-final Office Action dated Jun. 30, 2021.
File history of U.S. Appl. No. 16/575,096, including non-final Office Action dated Apr. 23, 2021.
Japanese Office Action dated May 30, 2022 for the counterpart Japanese Patent Application No. 2021-505931.
Chinese Office Action dated Jul. 12, 2022 for the counterpart Chinese Patent Application No. 201980065059.X.

* cited by examiner

Trajectory Generation

Path Tracking

AUTOMATED REVERSING BY FOLLOWING USER-SELECTED TRAJECTORIES AND ESTIMATING VEHICLE MOTION

CROSS REFERENCE TO RELATED APPLICATIONS

This U.S. patent application claims priority under 35 U.S.C. § 119(e) to U.S. Provisional Application 62/714,385, filed on Aug. 3, 2018, which is hereby incorporated by reference in its entirety.

TECHNICAL FIELD

This disclosure relates to a method and device for automated reversing by following user-selected trajectories and estimating vehicle motion.

BACKGROUND

Trailers are usually unpowered vehicles that are pulled by a powered tow vehicle. A trailer may be a utility trailer, a popup camper, a travel trailer, livestock trailer, flatbed trailer, enclosed car hauler, and boat trailer, among others. The tow vehicle may be a car, a crossover, a truck, a van, a sports-utility-vehicle (SUV), a recreational vehicle (RV), or any other vehicle configured to attach to the trailer and pull the trailer. The trailer may be attached to a powered vehicle using a trailer hitch. A receiver hitch mounts on the tow vehicle and connects to the trailer hitch to form a connection. The trailer hitch may be a ball and socket, a fifth wheel and gooseneck, or a trailer jack. Other attachment mechanisms may also be used. In addition to the mechanical connection between the trailer and the powered vehicle, in some examples, the trailer is electrically connected to the tow vehicle. As such, the electrical connection allows the trailer to take the feed from the powered vehicle's rear light circuit, allowing the trailer to have taillights, turn signals, and brake lights that are in sync with the lights of the powered vehicle.

Recent advancements in computing and sensor technology have led to improved vehicle autonomous driving. As such, it is desirable to provide an automated vehicle reverse system that is capable of planning a path from a tow vehicle to the trailer allowing the vehicle to autonomously maneuver towards the trailer.

SUMMARY

One aspect of the disclosure provides a method of autonomously driving a vehicle in a rearward direction towards a point of interest. The method includes receiving, at data processing hardware, one or more images from a camera positioned on a back portion of the vehicle and in communication with the data processing hardware. The method also includes receiving, at the data processing hardware, a driver planned path from a user interface in communication with the data processing hardware. The driver planned path includes a plurality of waypoints. The method includes transmitting, from the data processing hardware to a drive system in communication with the data processing hardware, one or more commands causing the vehicle to autonomously maneuver along the driver planned path. The method includes determining, at the data processing hardware, a current vehicle position. In addition, the method includes determining, at the data processing hardware, an estimated subsequent vehicle position based on the driver planned path. The estimated subsequent vehicle position being at a subsequent waypoint along the driver planned path from the current vehicle position. The method also includes determining, at the data processing hardware, a path adjustment from the current vehicle position to the estimated subsequent vehicle position. Additionally, the method includes transmitting, from the data processing hardware to the drive system, instructions causing the vehicle to autonomously maneuver towards the estimated subsequent vehicle position based on the path adjustment.

Another aspect of the disclosure provides a method of autonomously driving a vehicle in a rearward direction towards a point of interest. The method includes receiving, at data processing hardware, one or more images from one or more cameras positioned on a back portion of the vehicle and in communication with the data processing hardware. The method includes receiving, at the data processing hardware, a driver planned path from a user interface in communication with the data processing hardware. The method also includes transmitting, from the data processing hardware to a drive system in communication with the data processing hardware, one or more commands causing the vehicle to autonomously maneuver along the driver planned path. Additionally, the method includes determining, at the data processing hardware, an estimated vehicle position based on the driver planned path. The method also includes determining, at the data processing hardware, a current vehicle position and determining, at the data processing hardware, an error based on the estimated vehicle position and the current vehicle position. The method also includes determining, at the data processing hardware, one or more path adjustment commands causing the vehicle to autonomously maneuver from the current vehicle position to the estimated vehicle position eliminating the error. The method includes transmitting, from the data processing hardware to the drive system, the one or more path adjustment commands.

Another aspect of the disclosure provides a system for autonomously maneuvering a vehicle in a rearward direction towards a point of interest. The system includes: data processing hardware; and memory hardware in communication with the data processing hardware. The memory hardware stores instructions that when executed on the data processing hardware cause the data processing hardware to perform operations that include the methods described above.

Implementations of the aspects of the disclosure may include one or more of the following optional features. In some implementations, the method includes overlaying a path on the one or more images and receiving a command by way of the user interface in communication with the data processing hardware. The command including instructions to adjust the path as the driver planned path. The command may include instructions to adjust a distance of the path. In some examples, the command includes instructions to adjust an angle of the path. The command may include instructions to adjust an angle of an end portion of the path.

In some examples, determining the current vehicle position includes receiving wheel encoder sensor data associated with one or more wheels and receiving steering angle sensor data. The current vehicle position is based on the wheel encoder sensor data and the steering angle sensor data.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
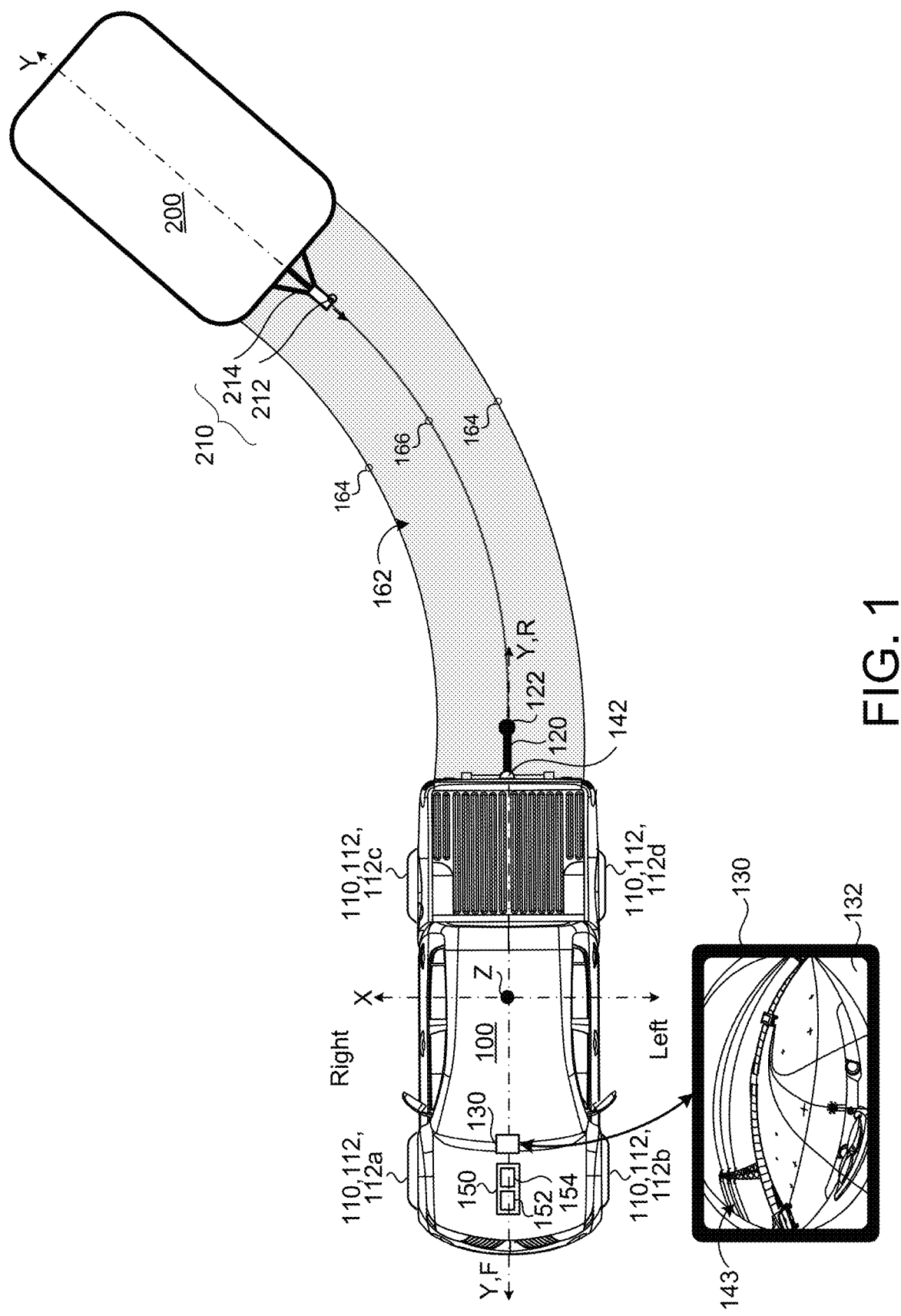
FIG. 1 is a schematic top view of an exemplary tow vehicle at a distance from a trailer.

A tow vehicle, such as, but not limited to a car, a crossover, a truck, a van, a sports-utility-vehicle (SUV), and a recreational vehicle (RV) may be configured to tow a trailer. The tow vehicle connects to the trailer by way of a trailer hitch. Backing up to a trailer manually may need a lot of effort from the driver. The driver must constantly monitor a rear vehicle camera and steer the vehicle to bring the tow ball of the vehicle underneath the coupler of a trailer. Therefore, it is desirable to have a tow vehicle that is capable of autonomously backing up towards a driver specified position, for example a trailer, identified from an image of the rearward environment of the vehicle and displayed on a user interface, such as a user display.

Referring to FIGS. 1-8B, in some implementations, a driver of a tow vehicle 100 wants to connect the tow vehicle 100 with a trailer 200 positioned behind the tow vehicle 100. In some implementations, the driver wants to specify a location or a trailer 200 behind the tow vehicle such that the tow vehicle 100 can autonomously maneuver towards the location or the trailer 200. When the tow vehicle 100 and the trailer 200 are aligned, the tow vehicle 100 may be hitched (e.g., by way of the driver or autonomously) with the trailer 200. In some examples, the tow vehicle 100 includes a tow vehicle hitch 120 having a tow ball 122. The trailer 200 may include a trailer hitch 210 that includes a trailer coupler 212 and a tow bar 214. Therefore, the tow ball 122 is coupled with the trailer coupler 212 when the tow vehicle 100 and the trailer 200 are hitched.

The tow vehicle 100 may include a drive system 110 that maneuvers the tow vehicle 100 across a road surface based on drive commands having x, y, and z components, for example. As shown, the drive system 110 includes a front right wheel 112, 112a, a front left wheel 112, 112b, a rear right wheel 112, 112c, and a rear left wheel 112, 112d. The drive system 110 may include other wheel configurations as well. The drive system 110 may also include a brake system 114 that includes brakes associated with each wheel 112, 112a-d, and an acceleration system 116 that is configured to adjust a speed and direction of the tow vehicle 100. In addition, the drive system 110 may include a suspension system 118 that includes tires associates with each wheel 112, 112a-d, tire air, springs, shock absorbers, and linkages that connect the tow vehicle 100 to its wheels 112, 112a-d and allows relative motion between the tow vehicle 100 and the wheels 112, 112a-d. The suspension system 132 may be configured to adjust a height of the tow vehicle 100 allowing a tow vehicle hitch 120 (e.g., a tow vehicle hitch ball 122) to align with a trailer hitch 210 (e.g., trailer hitch coupler 212), which allows for autonomous connection between the tow vehicle 100 and the trailer 200.

The tow vehicle 100 may move across the road surface by various combinations of movements relative to three mutually perpendicular axes defined by the tow vehicle 100: a transverse axis X, a fore-aft axis Y, and a central vertical axis Z. The transverse axis x extends between a right side and a left side of the tow vehicle 100. A forward drive direction along the fore-aft axis Y is designated as F, also referred to as a forward motion. In addition, an aft or rearward drive direction along the fore-aft direction Y is designated as R, also referred to as rearward motion. When the suspension system 118 adjusts the suspension of the tow vehicle 100, the tow vehicle 100 may tilt about the X axis and or Y axis, or move along the central vertical axis Z.

The tow vehicle 100 may include a user interface 130. The user interface 130 may include the display 132, a knob 134, and a button 136, which are used as input mechanisms. In some examples, the display 132 may show the knob 134 and the button 136. While in other examples, the knob 134 and the button 136 are a knob-button combination. In some examples, the user interface 130 receives one or more driver commands from the driver via one or more input mechanisms or a touch screen display 132 and/or displays one or more notifications to the driver. The user interface 130 is in communication with a vehicle controller 150, which is in turn in communication with a sensor system 140. In some examples, the display 132 displays an image 143 of an environment of the tow vehicle 100 leading to one or more commands being received by the user interface 130 (from the driver) that initiate execution of one or more behaviors. In some examples, the user display 132 displays an image 143 of the rearward environment of the vehicle 100. In this case, the driver can select a position within the image 143 that the driver wants the vehicle to autonomously maneuver towards. In some examples, the user display 132 displays one or more representations of trailers 200 positioned behind the vehicle 100. In this case, the driver selects one representation of a trailer 200 for the vehicle 100 to autonomously maneuver towards or the driver selects a path 162 causing the tow vehicle 100 to maneuver towards a selects trailer 200.

The tow vehicle 100 may include a sensor system 140 to provide reliable and robust driving. The sensor system 140 may include different types of sensors that may be used separately or with one another to create a perception of the environment of the tow vehicle 100 that is used for the tow vehicle 100 to drive and aid the driver in make intelligent decisions based on objects and obstacles detected by the sensor system 140. The sensor system 140 may include the one or more cameras 142. The sensor system 140 may include a rearward camera 142 mounted on the vehicle 100 to provide a view of a rear-driving path for the tow vehicle 100. The rear camera 142 may include a fisheye lens that includes an ultra wide-angle lens that produces strong visual distortion intended to create a wide panoramic or hemispherical image. Fisheye cameras capture images having an extremely wide angle of view. Moreover, images captured by the fisheye camera have a characteristic convex non-rectilinear appearance. Other types of cameras may also be used to capture images of the rear of the vehicle 100.

The sensor system 140 may include other sensors such as, but not limited to, inertial measuring unit (IMU) radar, sonar, LIDAR (Light Detection and Ranging, which can entail optical remote sensing that measures properties of scattered light to find range and/or other information of a distant target), LADAR (Laser Detection and Ranging), ultrasonic sensors, etc.

The vehicle controller 150 includes a computing device (or processor) 152 (e.g., central processing unit having one or more computing processors) in communication with non-transitory memory 154 (e.g., a hard disk, flash memory, random-access memory, memory hardware) capable of storing instructions executable on the computing processor(s) 152.

Figure 2A:
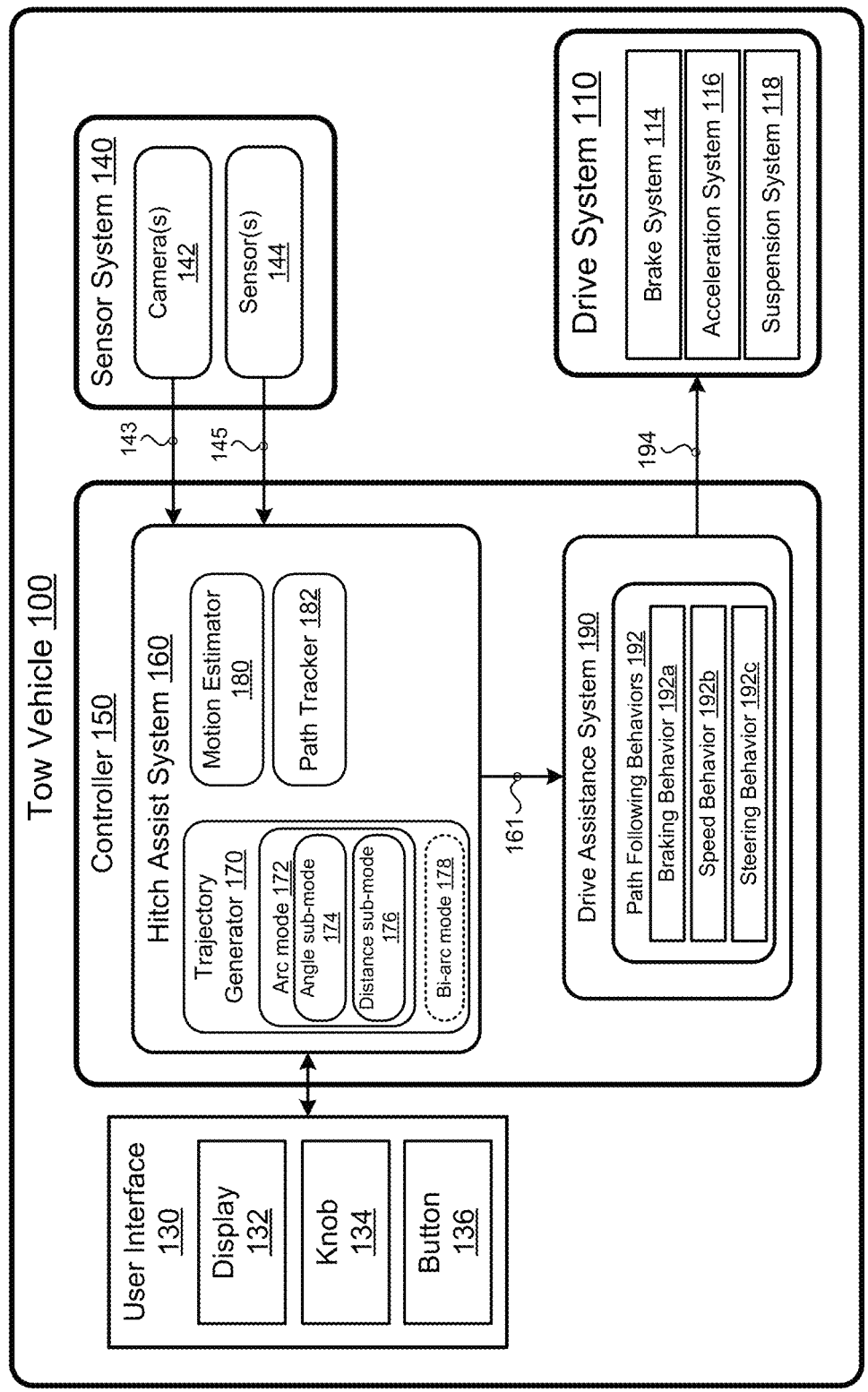
FIGS. 2A-2B are schematic views of an exemplary tow vehicle system.
Figure 2B:
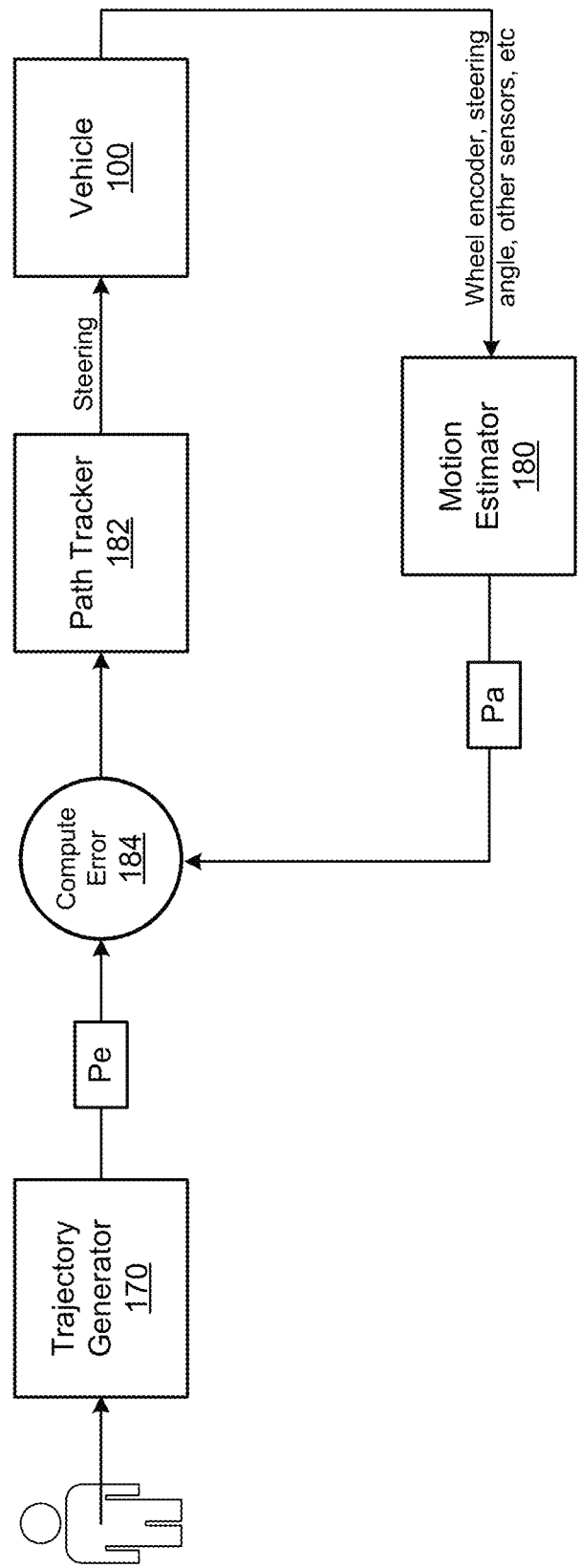

Referring to FIGS. 2A and 2B, the vehicle controller 150 executes a hitch assist system 160 that aids the driver in selecting a path 162 for autonomously driving the tow vehicle 100 towards the trailer 200. The driver may initiate execution of the hitch assist system 160 by way of the user interface 130, for example, making a selection on the display 132. Once initiated, the hitch assist system 160 instructs the display 132 to display a path 162 of the vehicle 100 that is superimposed on the camera image 143 of the rearward environment of the vehicle 100. The driver may change the planned path 162 using the user interface 130. For example, the driver may turn the knob 134, which simulates a virtual steering wheel. As the driver is turning the knob 134, the planned path 162 shown on the display 132 is updated. The driver adjusts the displayed path 162 until an updated planned path 162 displayed on the display 132 intersects the trailer representation 138 or other object that the driver wants the vehicle 100 to drive towards. Once the driver is satisfied with the planned path 162 displayed, then the driver executes an action indicative of finalizing the path 162 which allows the vehicle 100 to autonomously follow the planned path.

In some implementations, the hitch assist system 160 includes a trajectory generator 170, a motion estimator 180, and a path tracker 182. The trajectory generator 170 determines an estimated position of the vehicle 100 based on the driver selected path 162. The motion estimator 180 determines an actual position of the vehicle 100, and the path tracker 580 determines an error 184 based on the estimated position Pe and the actual position Pa and adjusts the planned path 162 of the vehicle 100 to eliminate the error 184 between the actual position Pa and the estimated position Pe.

In some implementations, the trajectory generator 170 receives images 143 from the camera 142 and superimposes the vehicle path 162 on the received image 143. The driver may adjust the path 162 selection based on one or more path modes 172. In some examples, the path modes 172 include an arc mode 172 having an angle sub-mode 174 and a distance sub-mode 176. In some examples, the path modes 172 may include a bi-arc mode 178. Therefore, the driver may select between the angle sub-mode 174, the distance sub-mode, and/or the bi-arc mode 178 for determining and adjusting the path 162 to a trailer 200 or an object.

Figure 3B:
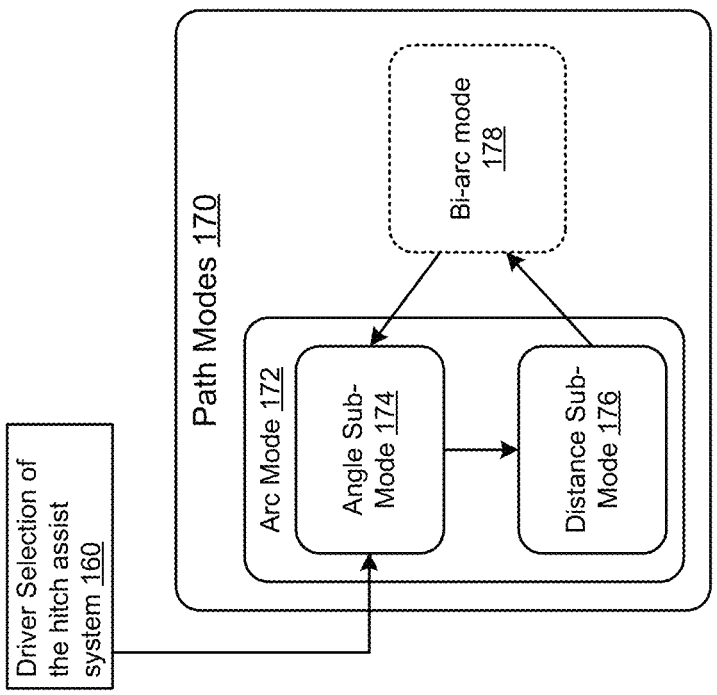
FIGS. 3A and 3B are schematic views of exemplary state charts of the system.
Figure 3A:
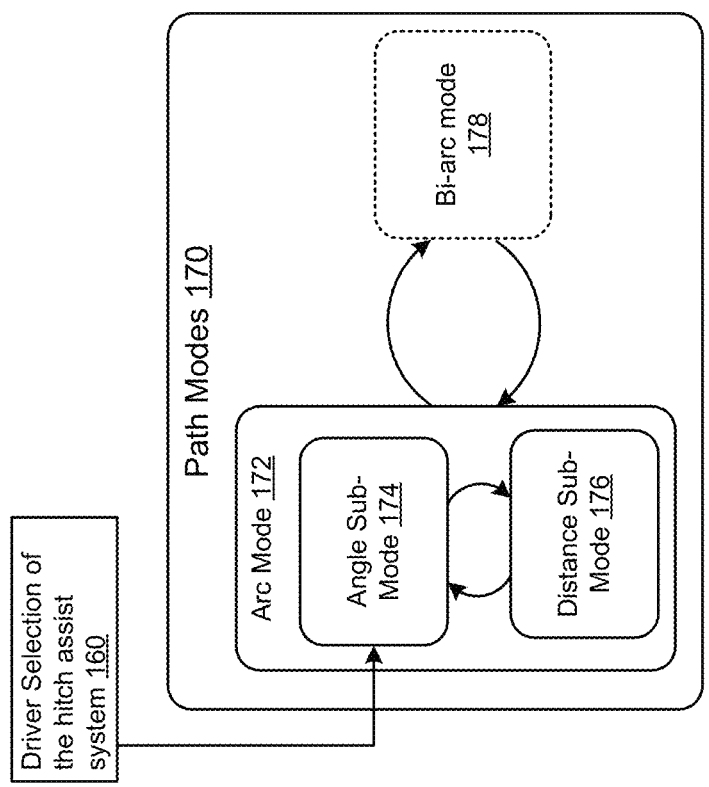

Referring to FIGS. 3A and 3B, in some examples, the angle sub-mode 174 and the distance sub-mode 176 are part of the arc-mode 172 (FIG. 3A), therefore, the driver first selects a mode 172, 178, and then selects the sub-mode within the selected mode 172, 178. As such, for examples, the display 132 may display an arc mode button 136 and a bi-arc mode button 136, that the driver can select from. FIG. 3B shows an example, where each sub-mode/mode 174, 176, 178 is independent. Therefore, a press or push of the button 136 rotates between the three modes 174, 176, 178.

Figure 4A:
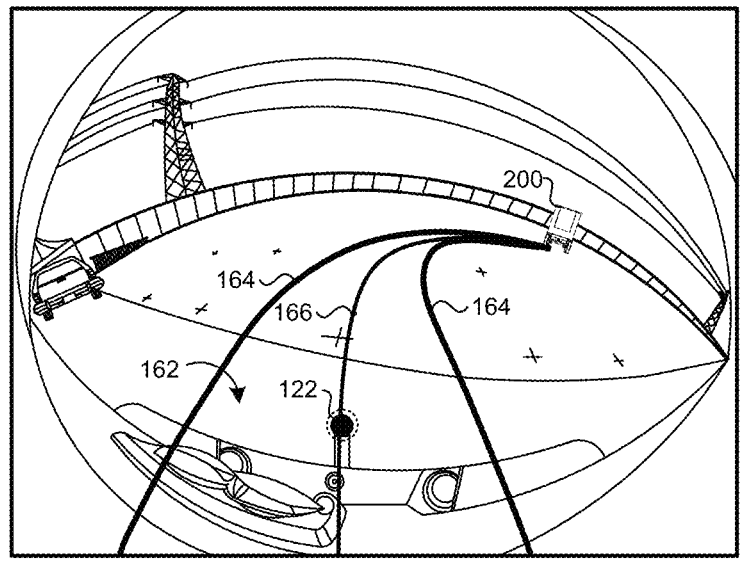
FIGS. 4A and 4B are schematic views of an exemplary angle mode.
Figure 4B:
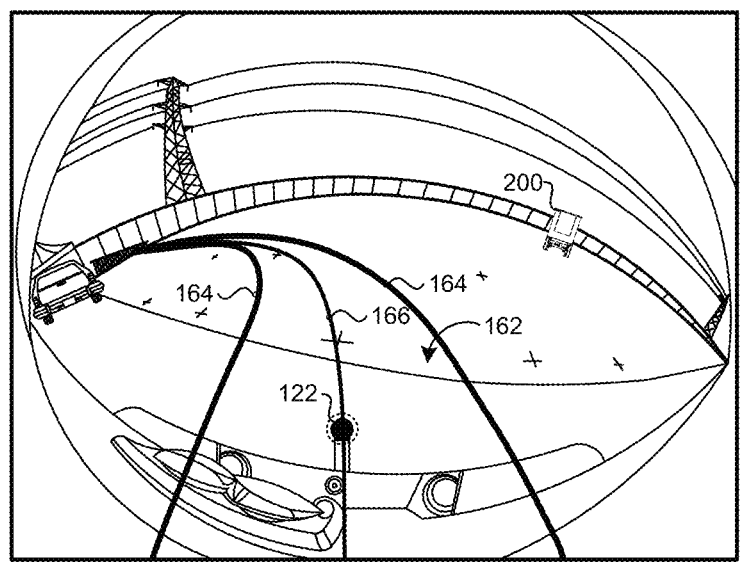
Figure 5A:
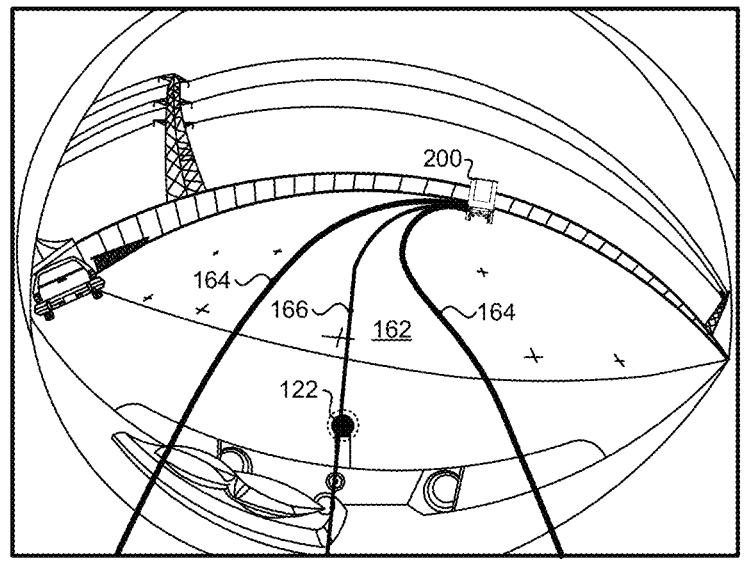
FIGS. 5A and 5B are schematic views of an exemplary distance mode.
Figure 5B:
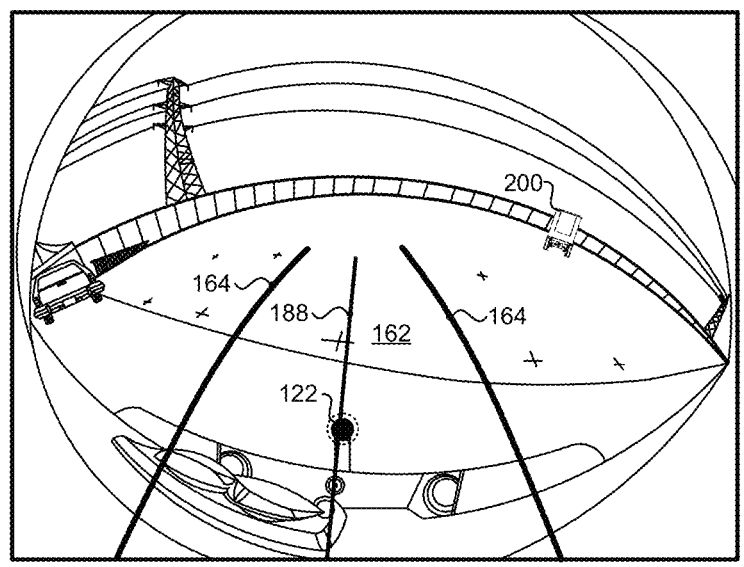
Figure 6A:
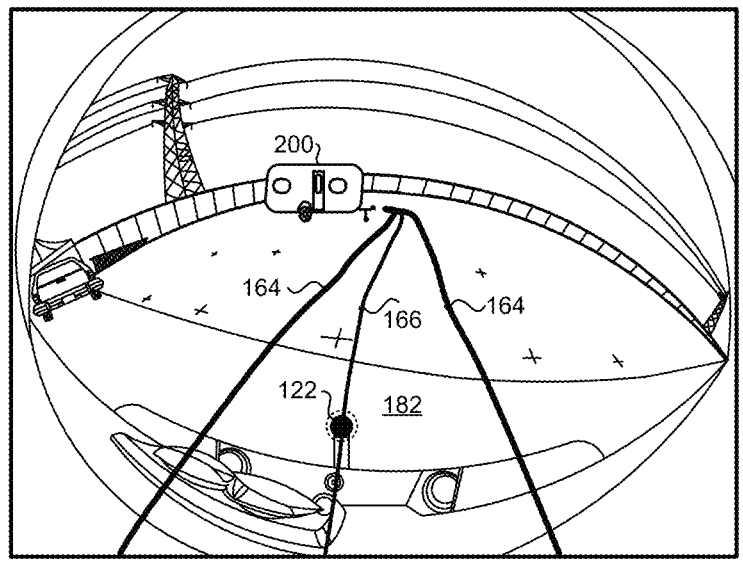
FIGS. 6A and 6B are schematic views of an exemplary bi-arc mode.
Figure 6B:
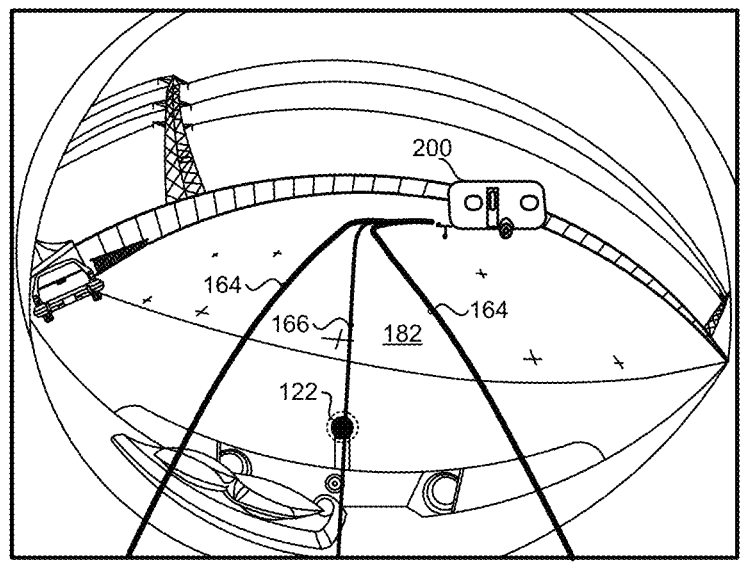
Figure 7A:
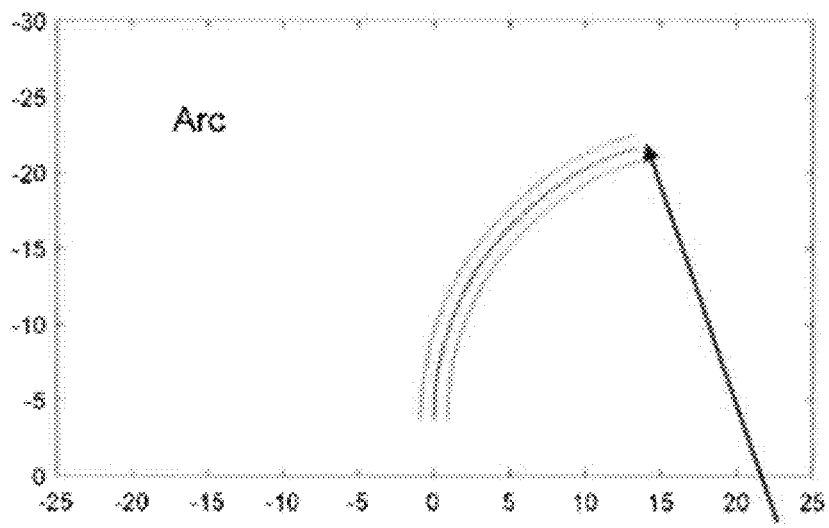
FIGS. 7A and 7B are schematic views of the trajectory generation calculations.
Figure 7B:
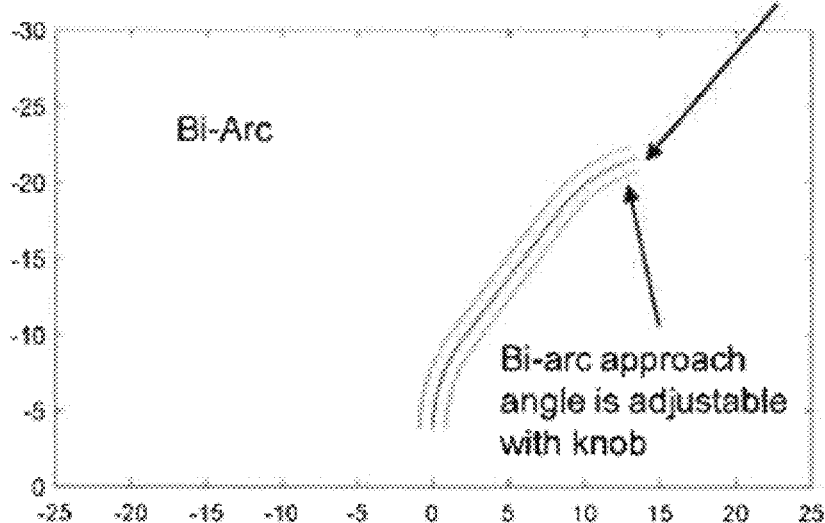

The angle sub-mode 174 is configured to adjust a curvature angle of the path 162 as shown in FIGS. 4A and 4B. Therefore, the driver can turn the knob 134 to the right causing the displayed path 162 to have a curvature to the right as shown in FIG. 4A. In addition, the driver my turn the knob 134 to the left causing the displayed path 162 to have a curvature to the left as shown in FIG. 4B. The distance sub-mode 176 is configured to adjust a length of the expected path 162 as shown in FIGS. 5A and 5B. For examples, referring to FIG. 5A, the driver can rotate the knob 134 to position a destination of the path 162 adjacent the trailer representation 138 in the image 143. Referring to FIG. 5B, the image 143 shows the path 162 having a shorter length than the path shown in FIG. 5A. Therefore, in this case, the driver may want that the tow vehicle 100 to autonomously move few meters in the rearward direction R. The bi-arc mode 178 is configured to adjust an approach angle indicative of how the vehicle 100 will be oriented with respect to the trailer 200 (or other object) at the end of the path 162 as shown in FIGS. 6A and 6B. For example, the bi-arc mode 178 aids the driver in aligning the tow vehicle 100 with the trailer 200 such that the fore-aft axis Y of the vehicle 100 is aligned with a fore-aft axis Y of the trailer 200, which helps the driver during the hitching process between the tow vehicle 100 and the trailer 200. Referring to FIGS. 7A and 7B, the arc mode 172 and the bi-arc mode 178 both have the same end point; however, the bi-arc mode 178 allows for an adjustment of the approach angle towards the trailer 200. In some examples, when the driver switches to bi-arc mode 178, the trajectory generator 170 keeps the start and end locations the same. In the bi-arc mode 178, the driver may adjust only the approach angle to the trailer 200. The driver does not adjust the distance in the bi-arc mode 178. In some examples, the radius and length of the driver selected path 162 determine the final position of the vehicle 100. The vehicle controller 150 uses Dubins path to determine the path 162 which is an optimal calculation.

In some implementations, where the bi-arc mode 178 is optional, if the driver is satisfied with the path 162 based on the arc mode 172 selection, then the driver may finalize the path 162 by pressing the button 136. Otherwise, the driver adjusts the knob 134 for the third time to change the shape of a bi-arc or other suitable path 162. This allows for adjusting the final approach angle to the trailer 200 or other object. Once the driver is satisfied with the choice of approach angle, he/she presses the button 136 to finalize the path choice.

In some implementations, the driver parks the tow vehicle 100 in a location where the trailer 200, or other object or point of interest, is within a field of view of the rear camera 142 of the vehicle 100. The engine of the tow vehicle 100 may be idling, and the transmission in Park position. The driver may initiate the trajectory generator 170 by pressing the button 136 and/or making a selection on the display 132. In some examples, the display 132 shows a selectable option or button 136 allowing the driver to initiate the Arc mode 172. The trajectory generator 170 begins by executing the angle sub-mode 174 of the arc mode 172, as shown in FIGS. 3A and 3B. The driver switches to distance sub-mode 176 to adjust the distance of the path 162, by for example, pressing the button 136. In some examples, the driver may adjust the path 162 by switching between angle sub-mode 174 and distance sub-mode 176 and adjusting the path 162 until the desired path 162 is shown on the display. The driver adjusts the path 162 such that the outer boundaries 164 of the path 162 interest the trailer 200 (i.e., the trailer representation 138 within the image 143) or other point of interest.

In some implementations, the final approach angle to the trailer 200 or the point of interest is important, for example, for aligning the vehicle fore-aft axis Y with the trailer fore-aft axis Y. In this case, the driver may select or press the "Arc/Bi-Arc Mode" button 136 (displayed on the display 132) and switch to the bi-arc mode 178. In the bi-arc mode 178 the previously set endpoint of the path 162 stays constant, and the driver adjusts the final approach angle with the knob 134. When the driver is satisfied with the final approach angle and with the complete trajectory or path 162, the driver may confirm the selected path 162 by executing an action. In some examples, the driver switches the transmission to reverse which is indicative that the driver is satisfied with the displayed path 162. In some examples, the driver switches the transmission into reverse with the brake on, then releases the brake, and the vehicle 100 follows the selected path 162. In some examples, while the vehicle is autonomously maneuvering in the rearward direction R along the path 162, the driver may stop the tow vehicle 100 by, for example, pressing the brake. This causes the vehicle controller 150 to exit the hitch assist system 160.

In some implementations, the trajectory generator 170 sets the path distance at a default, which allows the driver to only adjust the steering angle until it intersects the trailer 200 or other point of interest.

In some implementation, the final approach angle is not adjusted. Instead, the final approach angle is always the same as the initial vehicle departure angle. So, the final vehicle fore-aft axis Y is parallel to the initial vehicle fore-aft axis Y. In this case, the driver adjusts the final location of the path 162 to interest with the trailer.

In some examples, while the tow vehicle 100 is maneuvering in the rearward direction R along the path 162, the display 132 may show a progress of the vehicle 100 along the path 162. For example, the display 132 may show an original trajectory projected on the ground, but updated by the vehicle's changing position. The display 132 may also show an indication of how well the vehicle is following this trajectory.

In some implementations, the trajectory generator 170 receives data from other vehicle systems to generate the path 162. In some examples, the trajectory generator 170 receive vehicle pose data defined by (x, y, θ) where x is the position of a center of the tow vehicle 100 along the transverse axis X in and X-Y plane, y is the position of a center of the vehicle along the fore-aft axis Y in the X-Y plane, and θ is the heading of the tow vehicle 100. In addition, the trajectory generator 170 may receive a position of the knob 134, e.g., a knob angle, from the knob 134. The trajectory generator 170 may also receive a mode button state (i.e., arc mode 172 or bi-arc mode 178), and the sub-mode button state (i.e., angle sub-mode 174 or distance sub-mode 176). Based on the received data, the trajectory generator 170 adjusts the path 162 and instructs the display 132 to display the path 162. In some examples, the path 162 includes outer boundaries 164 and a tow ball path 166 being the estimated path of the tow ball 122. The trajectory generator 170 may also instruct the display 132 to show the current mode or sub-mode status indicative of the mode/sub-mode the drive has selected to adjust the path 162.

Referring back to FIGS. 2A and 2B, once the driver indicates via the user interface 130 that his path selection is complete, the vehicle controller 150 executes the driver assistance system 190 to follow the planned path 162. The driver assistance system 190 includes path following behaviors 192. The path following behaviors 330 receive the selected path 162 and executes one or more behaviors 330a-b that send commands 194 to the drive system 110, causing the vehicle 100 to autonomously drive along the planned path 162. As the vehicle 100 is autonomously maneuvering along the planned path 162, the hitch assist system 160 continuously updates the path 162 based on the motion estimator 180 and the path tracker as discussed below.

Referring back to FIGS. 2A and 2B, the motion estimator 180 determines a current position Pa of the vehicle 100 as it is autonomously maneuvering in the rearward direction R along the path 162. As previously discussed, the trajectory generator 170 determines where the vehicle 100 should be based on the planned path 162, i.e., estimated position Pe; therefore the motion estimator determines an actual position Pa of the vehicle 100. In some examples, the motion estimator includes a motion estimation algorithm that outputs relative vehicle position and speed. For example, the motion estimation algorithm may include an Extended Kalman Filter (EKF). The EKF uses measurements, such as, but not limited to, encoders from 4 wheels (e.g., 96 ticks per revolution), and steering angle. The motion estimator 180 fuses the measurements to determine the actual position of the vehicle 100. The motion estimator 180 may use bicycle model due to the slow speed of the tow vehicle 100 as it is autonomously moving in the rearward direction. The bicycle model uses a single steered wheel in front to represent both front wheels, and it uses a single non-steered wheel in the rear to represent both rear wheels. The wheels are joined by a single rigid link. Motion is restricted to a two-dimensional horizontal ground plane. The inputs of the bicycle model are speed and steer angle, while its state is position and heading. The motion estimator 180 estimates linear and rotational speeds, and position (e.g., orientation of the vehicle). In some examples, the motion estimator 180 considers sensor data from the sensor system 140, for example, camera, radar, GPS measurement to improve any drift.

In some implementations, the motion estimator 180 uses an Extended Kalman Filter (EKF). The EKF equations are also provided below as equations (3)-(7). The state vector has nine elements shown in equation 1:

$$\mu = [x\ y\ \theta v\ \omega\ d_{lr}\ d_{rr}\ d_{lf}\ d_{rf}]^T \qquad (1)$$

The first three are the "pose" of the vehicle, (x, y, θ). The next two are the linear and angular speeds, (v, ω). The final four are the distances traveled by the four tires, ($d_{lr}$, $d_{rr}$, $d_{lf}$, $d_{rf}$), left-rear, right-rear, left-front, right-front, respectively.

The complete measurement vector has five elements shown in equation 2:

$$z = [d_{lr}\ d_{rr}\ d_{lf}\ d_{rf}\ \varphi]^T. \qquad (2)$$

The first four are, again, the distances traveled by the four tires, ($d_{lr}$, $d_{rr}$, $d_{lf}$, $d_{rf}$). The final element φ is the average front wheel angle (not the steering wheel angle but the average angle of the front tires with respect to the longitudinal axis).

The motion estimator 180 provides a vehicle speed estimate. It is common to compute an approximate speed by dividing distance change by time change (Δd/Δt), however, this would be very noisy for the situation here, where there are relatively few wheel encoder counts, and the vehicle is moving relatively slowly. Thus, to avoid a direct calculation involving dividing distance change by time change (Δd/Δt), the motion estimator 180 estimates the vehicle linear speed v by using the EKF, based on the measured wheel accumulated distances, and there is no explicit rate calculation involving division.

The Extended Kalman Filter may be written as two Prediction equations and three Measurement equations. The Prediction equations are:

$$\bar{\mu}_t = g(u_t, \mu_{t-1}) \quad (3)$$

$$\bar{\Sigma} = G_t \Sigma_{t-1} G_t^T + R_t \quad (4)$$

Equation (3) provides an update to the state μ. Equation (4) provides an update to the covariance Σ. The covariance provides an estimate of the current uncertainty of the states. The matrix R is the noise covariance for the state μ.

The measurement update equations are:

$$K_t = \bar{\Sigma}_t H_t^T (H_t \bar{\Sigma}_t H_t^T + Q_T)^{-1}, \quad (5)$$

$$\mu_t = \bar{\mu}_t + K_t(z_t - h(\bar{\mu}_t)), \quad (6)$$

$\Sigma_t = (I - K_t H_t)\bar{\Sigma}_t$. (7) Equation (5) sets the value of the optimal Kalman gain K. Equation (6) provides an update to the state μ. Equation (7) provides an update to the covariance E. The matrix Q is the noise covariance for the measurement z.

For prediction the nonlinear vector function g needs to be defined. The matrix G is the derivative of this vector function. For convenience, it will be provided as well. The vector function g is given by:

$$g(\mu) = \mu + \begin{bmatrix} (v\cos\theta)\Delta t \\ (v\sin\theta)\Delta t \\ \omega \Delta t \\ 0 \\ 0 \\ (v - w\omega/2)\Delta t \\ (v + w\omega/2)\Delta t \\ -\Delta t\sqrt{(l\omega)^2 + (v - w\omega/2)^2} \\ -\Delta t\sqrt{(l\omega)^2 + (v + w\omega/2)^2} \end{bmatrix} \quad (8)$$

Here, w is the "track width" of the vehicle. More specifically, it is the lateral distance from the center of a left tire to the center of a right tire. It is assumed that the front and rear distances between tires are the same. The wheelbase is denoted by 1. Note that in the last two elements, there is a minus sign where expressions are subtracted from $d_{lf}$ and $d_{rf}$. This minus sign assumes backward motion. Thus, this prediction equation could not be used for forward motion. However, if there were some measurement of the direction of the vehicle (forward or backward), then it would be a simple matter to change the sign of the last two elements (positive for forward, negative for backward) to make the equations valid for both forward and backward directions.

The matrix G has nine rows and nine columns. Let $$G = I + \bar{G}\Delta t. \quad (9)$$

I is the 9×9 identity matrix. Then, $$\bar{G}_{13} = -(v\sin\theta), \quad \bar{G}_{14} = (\cos\theta) \quad (10)$$

$$\bar{G}_{23} = (v\cos\theta), \quad \bar{G}_{24} = (\sin\theta)$$

$$\bar{G}_{35} = 1$$

-continued $$\bar{G}_{64} = 1, \quad \bar{G}_{65} = -(w/2)$$

$$\bar{G}_{74} = 1, \quad \bar{G}_{75} = (w/2)$$

$$\bar{G}_{84} = -\frac{v - w\omega/2}{\sqrt{(l\omega)^2 + (v - w\omega/2)^2}},$$

$$\bar{G}_{85} = -\frac{-(w/2)(v - w\omega/2) + l^2\omega}{\sqrt{(l\omega)^2 + (v - w\omega/2)^2}}$$

$$\bar{G}_{94} = -\frac{v + w\omega/2}{\sqrt{(l\omega)^2 + (v + w\omega/2)^2}},$$

$$\bar{G}_{95} = -\frac{(w/2)(v + w\omega/2) + l^2\omega}{\sqrt{(l\omega)^2 + (v + w\omega/2)^2}}.$$

All other elements are zero.

The complete update assumes measurements of the wheel ticks and the wheel angle are all available at the same time. If only the wheel ticks are available, then they may be incorporated separately, and if only the wheel angle is available, it may be incorporated separately. For the complete update, the vector h is defined. The matrix H is the derivative of this vector function. For convenience, it will be provided as well. The vector function h is given by:

$$h(\mu) = \begin{bmatrix} d_{lr} \\ d_{rr} \\ d_{lf} \\ d_{rf} \\ \tan^{-1}(l\omega/v) \end{bmatrix}, \quad v \neq 0. \quad (11)$$

The H matrix is the derivative of h and is 5×. The non-zero elements are $$H_{11} = H_{22} = H_{33} = H_{44} = 1$$

$$H_{54} = -l\omega/(v^2 + l^2\omega^2), H_{55} = lv/(v^2 + l^2\omega^2), v^2 + l^2\omega^2 \neq 0$$

Note that certain quantities, $h_5$, $H_{54}$, $H_{55}$, involve divisors which could easily be zero. Thus, implementation requires testing that these divisors are not zero before performing the divisions.

A measurement consisting of wheel ticks alone can be accommodated, as can a measurement consisting of steering angle alone. However, these variations are not included because they are straightforward, given the information that has been provided.

During the vehicle's autonomous maneuvering in the rearward direction R along the planned path 162, the trajectory generator 170 determines where the vehicle 100 should be based on the planned path 162, i.e., estimated position Pe; while the motion estimator 180 determines an actual position Pa of the vehicle 100; therefore the path tracker 182 determines an error 184 based on the estimated position Pe and the actual position Pa. The path tracker 182 adjusts the vehicle's current position Pa based on the error 184 such that the vehicle 100 continues to follow the planned path 162.

Figure 8A:
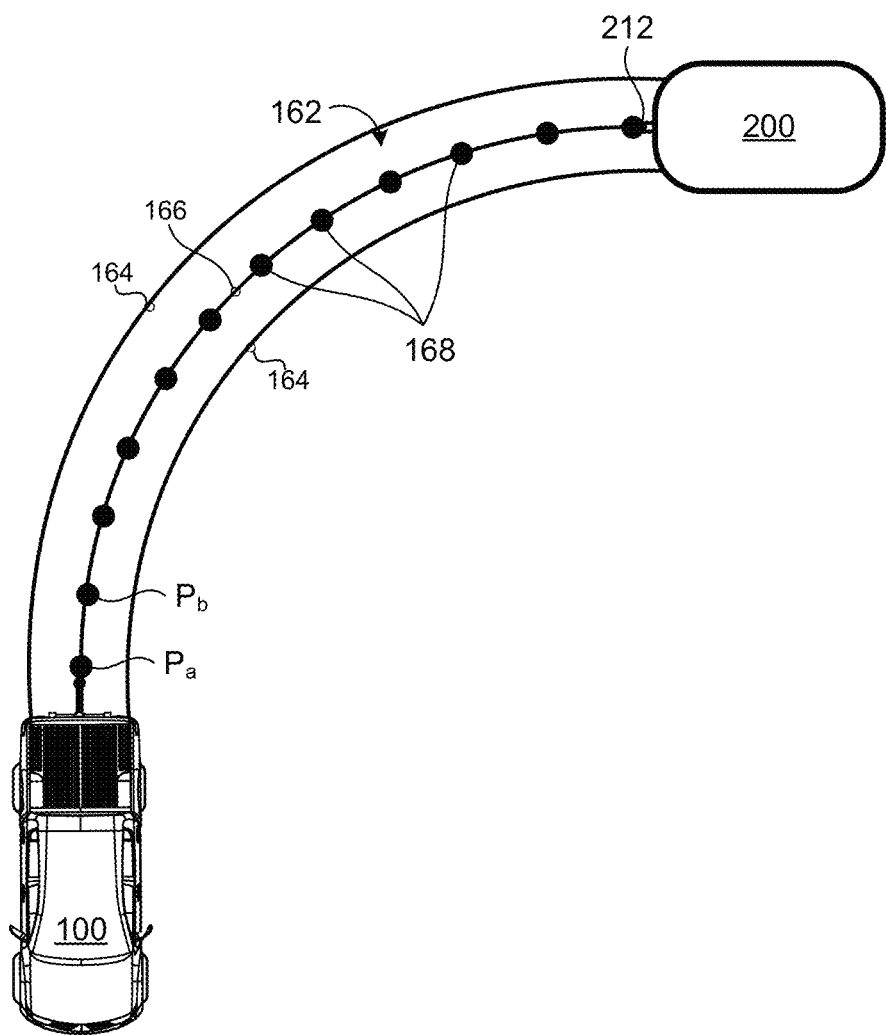
FIGS. 8A and 8B are schematic views of motion estimation calculations.
Figure 8B:
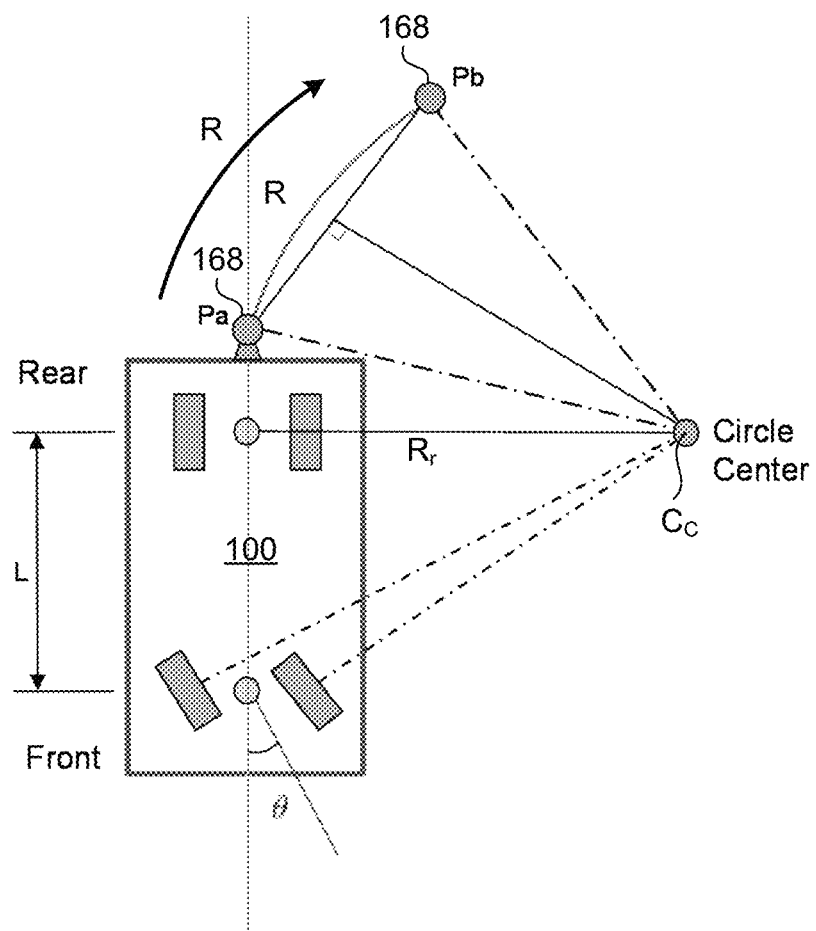

Referring to FIGS. 8A and 8B, in some implementations, the path tracker 182 executes a pure pursuit approach to keep the vehicle 100 on the planned path 162. The driver selected path 162 is sampled at predefined intervals of time, for examples, every minute, to produce a plurality of waypoints 168 positioned along the tow ball path 166 of the planned path 162. The path tracker 182 (e.g., algorithm) compares a current tow-ball position and heading Pa received from the motion estimator 180 with the next waypoint position Pb. The vehicle hitch assist system 160 constantly adjusted the vehicle steering toward the current waypoint Pb, i.e., the waypoint that the vehicle is driving towards. The path tracker 182 allows the vehicle tow-ball 122 to track each waypoint 168. In other words, the path tracker 182 allows for the tow-ball 122 to go to each waypoint along the tow ball path 166. In some examples, the waypoint 168 is transformed into vehicle coordinates from world coordinates. For example, the path tracker 182 calculates a center Cc of a turning circle based on the tow-ball position Pa and the waypoint position Pb. Then the path tracker 182 calculates a vehicle turning radius Rr based on the center of the turning circle. Finally, the path tracker 182 calculates a steering angle based on the center of turning circle using Ackermann angle. In other words, the path tracker 580 compares an estimated location Pe with the current location Pa to make sure the vehicle is following the path and determines a next waypoint Pb and determines or adjusts the path from the current vehicle position and heading to the next or subsequent waypoint Pb. Thus the path tracker 580 maintains that the tow vehicle 100 autonomously maneuvers along the planned path and adjusts the vehicle's behavior or driving when the vehicle 100 veers from the planned path.

In some examples, the controller includes an object detection system (not shown) that identifies one or more objects along the planned path 162. In this case, the hitch assist system 160 adjusts the path 162 to avoid the detected one or more objects. In some examples, the hitch assist system 160 determines a probability of collision and if the probability of collision exceeds a predetermined threshold, the hitch assist system 160 adjusts the path 162 and sends it to the driver assistance system 190.

Once the driver indicated that the selected path 162 is entered, then the vehicle controller 150 executes a driver assistance system 190, which in turn includes path following behaviors 330. The path following behaviors 330 receive the selected path 162 and executes one or more behaviors 330a-b that send commands 194 to the drive system 110, causing the vehicle 100 to autonomously drive along the planned path in the rearward direction R.

The path following behaviors 192a-b may include one or more behaviors, such as, but not limited to, a braking behavior 192a, a speed behavior 192b, and a steering behavior 192c. Each behavior 192a-b causes the vehicle 100 to take an action, such as driving backward, turning at a specific angle, breaking, speeding, slowing down, among others. The vehicle controller 150 may maneuver the vehicle 100 in any direction across the road surface by controlling the drive system 110, more specifically by issuing commands 194 to the drive system 110.

The braking behavior 192a may be executed to either stop the vehicle 100 or to slow down the vehicle 100 based on the planned path. The braking behavior 192a sends a signal or command 194 to the drive system 110, e.g., the brake system (not shown), to either stop the vehicle 100 or reduce the speed of the vehicle 100.

The speed behavior 192b may be executed to change the speed of the vehicle 100 by either accelerating or decelerating based on the planned path 162. The speed behavior 192b sends a signal or command 194 to the brake system 114 for decelerating or the acceleration system 116 for accelerating.

The steering behavior 192c may be executed to change the direction of the vehicle 100 based on the planned path 162. As such, the steering behavior 192c sends the acceleration system 130 a signal or command 194 indicative of an angle of steering causing the drive system 110 to change direction.

Figure 9:
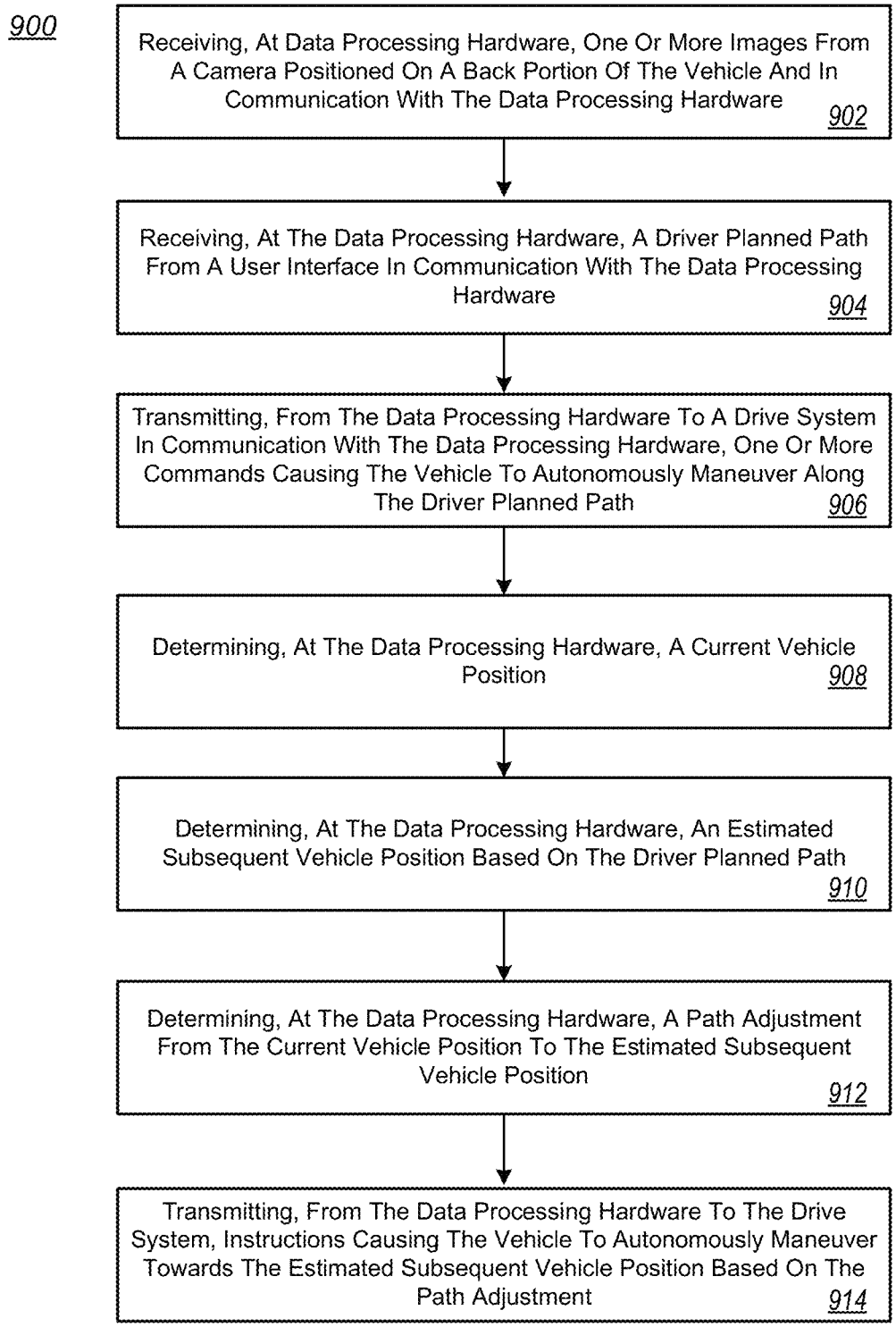
FIG. 9 is a schematic view of an exemplary method of autonomously driving a vehicle in a rearward direction towards a point of interest.

FIG. 9 provides an example arrangement of operations of a method 900 for autonomously maneuvering a vehicle 100 (e.g., a tow vehicle) in a rearward direction R towards a point of interest, such as a trailer 200, using the system described in FIGS. 1-8B. At block 902, the method 900 includes, receiving, at data processing hardware 152, one or more images 143 from a camera 142 positioned on a back portion of the vehicle 100 and in communication with the data processing hardware 152. At block 904, the method 900 includes receiving, at the data processing hardware 152, a driver planned path 162 from a user interface 130 in communication with the data processing hardware 152. The driver planned path 162 includes a plurality of waypoints 168. At block 906, the method 900 includes transmitting, from the data processing hardware 152 to a drive system 110 in communication with the data processing hardware 152, one or more commands 161, 194 causing the vehicle 100 to autonomously maneuver along the driver planned path 162. At block 908, the method 900 includes determining, at the data processing hardware 152, a current vehicle position Pa. At block 910, the method 900 includes determining, at the data processing hardware 152, an estimated subsequent vehicle position based on the driver planned path, the estimated subsequent vehicle position being at a subsequent waypoint Pb along the driver planned path 162 from the current vehicle position Pa. At block 912, the method 900 includes determining, at the data processing hardware 152, a path adjustment from the current vehicle position Pa to the estimated subsequent vehicle position Pb. At block 914, the method 900 includes transmitting, from the data processing hardware 152 to the drive system 110, instructions causing the vehicle 100 to autonomously maneuver towards the estimated subsequent vehicle position Pb based on the path adjustment.

Figure 10:
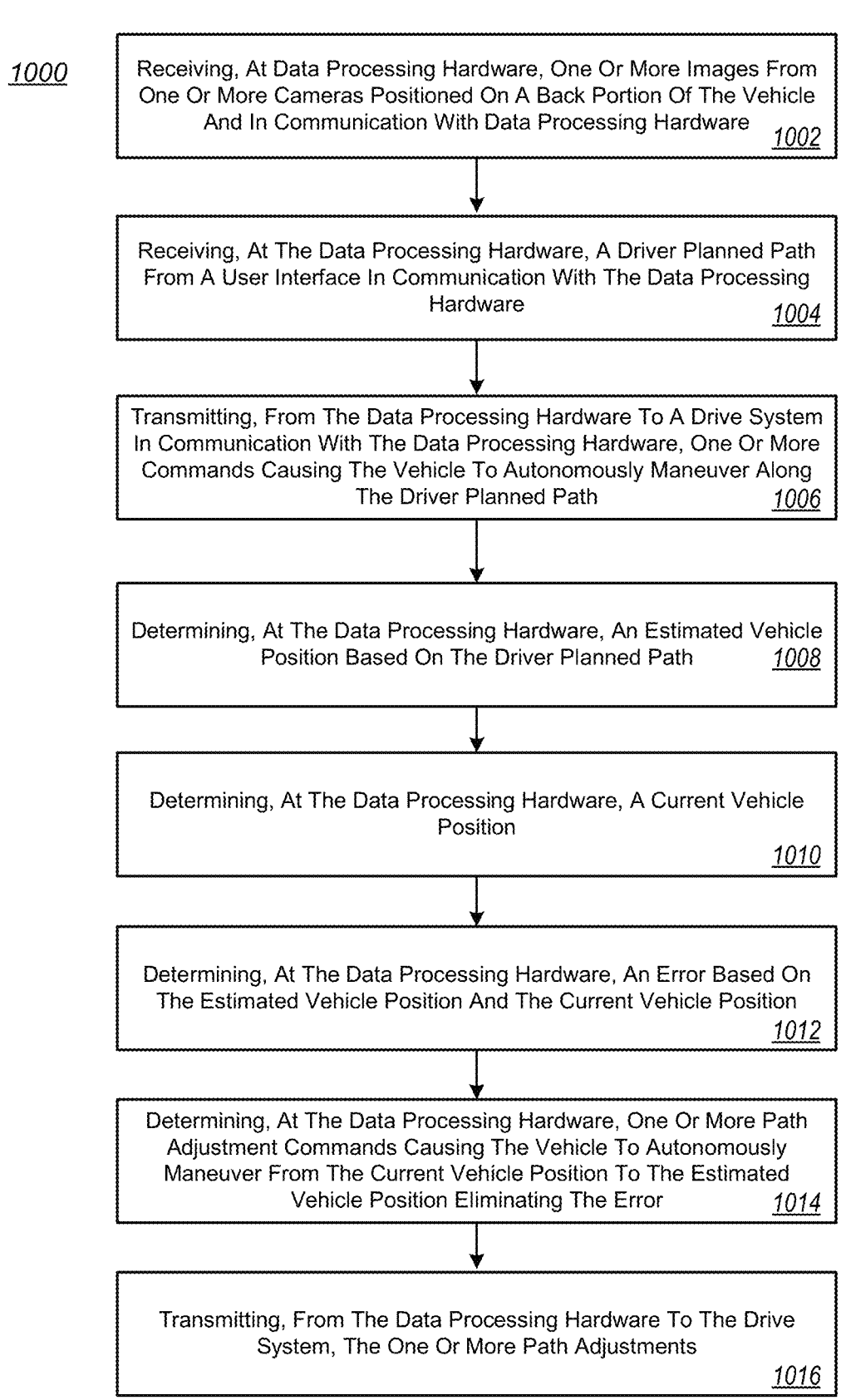
FIG. 10 is a schematic view of an exemplary method of autonomously driving a vehicle in a rearward direction towards a point of interest.

FIG. 10 provides an example arrangement of operations of another method 1000 for autonomously maneuvering a vehicle 100 (e.g., a tow vehicle) in a rearward direction R towards a point of interest, such as a trailer 200, using the system described in FIGS. 1-8B. At block 1002, the method 1000 includes receiving, at data processing hardware 152, one or more images 143 from one or more cameras 142 positioned on a back portion of the vehicle 100 and in communication with the data processing hardware 152. At block 1004, the method 1000 includes receiving, at the data processing hardware 152, a driver planned path 162 from a user interface 130 in communication with the data processing hardware 152. At block 1006, the method 1000 includes transmitting, from the data processing hardware 152 to a drive system 110 in communication with the data processing hardware 152, one or more commands causing the vehicle 100 to autonomously maneuver along the driver planned path 162. At block 1008, the method 1000 includes determining, at the data processing hardware 152, an estimated vehicle position Pe based on the driver planned path 162. At block 1010, the method 1000 includes determining, at the data processing hardware 152, a current vehicle position Pa. At block 1012, the method 1000 includes determining, at the data processing hardware 152, an error 184 based on the estimated vehicle position Pe and the current vehicle position Pa. At block 1014, the method 1000 includes determining, at the data processing hardware 152, one or more path adjustment commands causing the vehicle 100 to autonomously maneuver from the current vehicle position Pa to the estimated vehicle position Pe eliminating the error 184. At block 1016, the method 1000 includes transmitting, from the data processing hardware 152 to the drive system 110, the one or more path adjustment commands.

In some examples, the method 900, 1000 includes overlaying a path on the one or more images 143 and receiving a command by way of the user interface 130 in communication with the data processing hardware 152. The command includes instructions to adjust the path as the driver planned path 162. In some examples, the command includes instructions to adjust a distance of the path. The command may include instructions to adjust an angle of the path and or instructions to adjust an angle of an end portion of the path.

In some implementations, determining the current vehicle position includes receiving wheel encoder sensor data 145 associated with one or more wheels 112 and receiving steering angle sensor data 145. The current vehicle position Pa is based on the wheel encoder sensor data 145 and the steering angle sensor data 145.

As previously discussed, the proposed algorithm is designed to work in real time in a standard CPU with or without the use of GPU, graphic accelerators, training, or FPGAs. In addition, the proposed approach provides an automated method that only needs initial input from the driver. In addition, the described system provides a compromise between providing guidelines for the driver and automating all rearward functions.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims.

What is claimed is:

1. A method of autonomously driving a vehicle in a rearward direction towards a point of interest, the method comprising:

receiving, at data processing hardware, one or more images from a camera positioned on a back portion of the vehicle and in communication with the data processing hardware;

receiving, at the data processing hardware, a driver planned path from a user interface in communication with the data processing hardware, the driver planned path comprising a plurality of waypoints;

transmitting, from the data processing hardware to a drive system in communication with the data processing hardware, one or more commands causing the vehicle to autonomously maneuver along the driver planned path;

determining, at the data processing hardware, a current vehicle position;

determining, at the data processing hardware, an estimated subsequent vehicle position based on the driver planned path, the estimated subsequent vehicle position being at a subsequent waypoint along the driver planned path from the current vehicle position;

determining, at the data processing hardware, a path adjustment of the driver planned path from the current vehicle position to the estimated subsequent vehicle position, comprising calculating a center of a turning circle based on the current vehicle position and the estimated subsequent vehicle position along the driver planned path, and calculating a turning radius based on the center of the turning circle;

transmitting, from the data processing hardware to the drive system, instructions causing the vehicle to autonomously maneuver towards the estimated subsequent vehicle position based on the path adjustment of the driver planned path, wherein the method further comprises sending, from the data processing hardware to a user interface prior to initial movement of the vehicle towards the point of interest, instructions causing the user interface to display the one or more images;

sending, prior to the initial movement of the vehicle, instructions from the data processing hardware to the user interface causing the user interface to overlay a path on the one or more images displayed;

receiving, prior to the initial movement, a driver command by way of the user interface in communication with the data processing hardware, the driver command including instructions to adjust the overlayed path, the adjusted overlayed path serving as the driver planned path; and prior to the initial movement of the vehicle, sending instructions from the data processing hardware to the user interface causing the user interface to display the overlayed path as the overlayed path is being adjusted, wherein the user interface includes a rotary knob and the instructions to adjust the overlayed path includes data corresponding to manual manipulation of the rotary knob.

2. The method of claim 1, wherein the driver command includes instructions to adjust a length of the overlayed path, and the instructions to adjust the length of the overlayed path includes the data corresponding to the manual manipulation of the rotary knob.

3. The method of claim 1, wherein the driver command includes instructions to adjust a curvature angle of the overlayed path, and the instructions to adjust the curvature angle of the overlayed path includes the data corresponding to the manual manipulation of the rotary knob.

4. The method of claim 1, wherein the driver command includes instructions to adjust an angle of an end portion of the overlayed path relative to the point of interest, and the instructions to adjust the end portion of the overlayed path includes the data corresponding to the manual manipulation of the rotary knob.

5. The method of claim 1, wherein determining the current vehicle position comprises:

receiving wheel encoder sensor data associated with one or more wheels;

receiving steering angle sensor data; and wherein the current vehicle position is based on the wheel encoder sensor data and the steering angle sensor data.

6. The method of claim 1, wherein determining a current vehicle position comprises using a bicycle model having a single steerable front wheel and a single rear wheel that is not steerable, the bicycle model having as inputs a speed of at least one of the front wheel or the rear wheel, and a steer angle of the front wheel, and having a state of position and heading of the vehicle.

7. The method of claim 1, wherein determining the current vehicle position comprises utilizing an Extended Kalman Filter and estimating linear speed of the vehicle based on measured wheel accumulated distance without using arithmetic division operation.

8. A system for autonomously driving a vehicle in a rearward direction towards a point of interest, the system comprising:

data processing hardware in communication; and memory hardware in communication with the data processing hardware, the memory hardware storing instructions that when executed on the data processing hardware cause the data processing hardware to perform operations comprising:

receiving one or more images from a camera positioned on a back portion of the vehicle and in communication with the data processing hardware;

receiving a driver planned path from a user interface in communication with the data processing hardware, the driver planned path comprising a plurality of waypoints;

transmitting to a drive system in communication with the data processing hardware, one or more commands causing the vehicle to autonomously maneuver along the driver planned path;

determining a current vehicle position;

determining an estimated subsequent vehicle position based on the driver planned path, the estimated subsequent vehicle position being at a subsequent waypoint along the driver planned path from the current vehicle position;

determining a path adjustment of the driver planned path from the current vehicle position to the estimated subsequent vehicle position;

transmitting to the drive system, instructions causing the vehicle to autonomously maneuver towards the estimated subsequent vehicle position based on the path adjustment of the driver planned path;

wherein the method further comprises sending, from the data processing hardware to a user interface prior to initial movement of the vehicle towards the point of interest, instructions causing the user interface to display the one or more images;

sending, prior to the initial movement of the vehicle, instructions from the data processing hardware to the user interface causing the user interface to overlay a path on the one or more images displayed;

receiving, prior to the initial movement, a driver command by way of the user interface in communication with the data processing hardware, the driver command including instructions to adjust the overlayed path, the adjusted overlayed path serving as the driver planned path; and prior to the initial movement of the vehicle, sending instructions from the data processing hardware to the user interface causing the user interface to display the overlayed path as the overlayed path is being adjusted, wherein the user interface includes a rotary knob and the instructions to adjust the overlayed path includes data corresponding to manual manipulation of the rotary knob.

9. The system of claim 8, wherein the driver command includes instructions to adjust a distance of the displayed, overlayed path, and the instructions to adjust the distance of the overlayed path includes the data corresponding to the manual manipulation of the rotary knob.

10. The system of claim 8, wherein the driver command includes instructions to adjust an angle of the displayed overlayed path, and the instructions to adjust the angle of the overlayed path includes the data corresponding to the manual manipulation of the rotary knob.

11. The system of claim 8, wherein the driver command includes instructions to adjust an angle of an end portion of the displayed overlayed path, and the instructions to adjust the angle of the end portion of the overlayed path includes the data corresponding to the manual manipulation of the rotary knob.

12. The system of claim 8, wherein determining the current vehicle position comprises:
receiving wheel encoder sensor data associated with one or more wheels;
receiving steering angle sensor data; and
wherein the current vehicle position is based on the wheel encoder sensor data and the steering angle sensor data.

13. The system of claim 8, wherein determining a current vehicle position comprises using a bicycle model having a single steerable front wheel and a single rear wheel that is not steerable, the bicycle model having as inputs a speed of at least one of the front wheel or the rear wheel, and a steer angle of the front wheel, and having a state of position and heading of the vehicle.

14. The system of claim 8, wherein determining the current vehicle position comprises utilizing an Extended Kalman Filter and estimating linear speed of the vehicle based on measured wheel accumulated distance without using arithmetic division operation.

15. A method of autonomously driving a vehicle in a rearward direction towards a point of interest, the method comprising:
receiving, at data processing hardware, one or more images from one or more cameras positioned on a back portion of the vehicle and in communication with the data processing hardware;
receiving, at the data processing hardware, a driver planned path from a user interface in communication with the data processing hardware;
transmitting, from the data processing hardware to a drive system in communication with the data processing hardware, one or more commands causing the vehicle to autonomously maneuver along the driver planned path;
determining, at the data processing hardware, an estimated vehicle position based on the driver planned path;
determining, at the data processing hardware, a current vehicle position;
determining, at the data processing hardware, an error based on the estimated vehicle position and the current vehicle position;
determining, at the data processing hardware, one or more path adjustment commands causing the vehicle to autonomously maneuver from the current vehicle position to the estimated vehicle position eliminating the error;
transmitting, from the data processing hardware to the drive system, the one or more path adjustment commands,
wherein the method further comprises
sending, from the data processing hardware to a user interface prior to initial movement of the current vehicle towards the point of interest, instructions causing the user interface to display the one or more images;
sending, prior to the initial movement, instructions from the data processing hardware to the user interface, causing the user interface to overlay a path on the one or more images displayed;
receiving, prior to the initial movement, a command by way of the user interface in communication with the data processing hardware, the command including instructions to adjust the path as the driver planned path; and
prior to the initial movement of the vehicle, sending instructions from the data processing hardware to the user interface causing the user interface to display the overlayed path as the overlayed path is being adjusted,
wherein the user interface includes a rotary knob and the instructions to adjust the overlayed path includes data corresponding to manual manipulation of the rotary knob.

16. The method of claim 15, wherein the command includes instructions to adjust a length of the path, and the instructions to adjust the length of the overlayed path includes the data corresponding to the manual manipulation of the rotary knob.

17. The method of claim 15, wherein the command includes instructions to adjust an angle of the path, and the instructions to adjust the angle of the overlayed path includes the data corresponding to the manual manipulation of the rotary knob.

18. The method of claim 15, wherein the command includes instructions to adjust an angle of an end portion of the path, and the instructions to adjust the end portion of the overlayed path includes the data corresponding to the manual manipulation of the rotary knob.

19. The method of claim 15, wherein determining the current vehicle position comprises:
receiving wheel encoder sensor data associated with one or more wheels;
receiving steering angle sensor data; and
wherein the current vehicle position is based on the wheel encoder sensor data and the steering angle sensor data.

20. The method of claim 15, wherein determining a current vehicle position comprises using a bicycle model having a single steerable front wheel and a single rear wheel that is not steerable, the bicycle model having as inputs a speed of at least one of the front wheel or the rear wheel, and a steer angle of the front wheel, and having a state of position and heading of the vehicle.

21. The method of claim 15, wherein determining the current vehicle position comprises utilizing an Extended Kalman Filter and estimating linear speed of the vehicle based on measured wheel accumulated distance without using arithmetic division operation.

* * * * *